United States Patent [19]
Cooley

[11] 4,138,763
[45] Feb. 13, 1979

[54] ATTACHABLE COASTER-LIKE DEVICE

[76] Inventor: Lawrence E. Cooley, 17536 Lake Shore Blvd., Cleveland, Ohio 44119

[21] Appl. No.: 759,789

[22] Filed: Jan. 17, 1977

[51] Int. Cl.² .............................................. B60B 33/00
[52] U.S. Cl. .................................. 16/18 R; 248/188.8
[58] Field of Search ............... 16/18 R, 29–35 R, 16/42 R, 40; 248/346.1, 188.8, 188.9; 188/32

[56] References Cited

U.S. PATENT DOCUMENTS

| | | | |
|---|---|---|---|
| 779,402 | 1/1905 | Abrams | 248/346.1 |
| 1,066,381 | 7/1913 | Daniel | 248/346.1 |
| 2,699,628 | 1/1955 | Auer | 248/346.1 |
| 2,844,909 | 7/1958 | Perchinsky | 248/346.1 |
| 3,537,721 | 11/1970 | Warner, Jr. | 16/18 R X |

FOREIGN PATENT DOCUMENTS

| | | | |
|---|---|---|---|
| 73080 | 1/1917 | Switzerland | 16/42 R |
| 74581 | 4/1894 | Fed. Rep. of Germany | 248/346.1 |
| 824691 | 11/1937 | France | 248/346.1 |

*Primary Examiner*—Dorsey Newton
*Attorney, Agent, or Firm*—Maky, Renner, Otto & Boisselle

[57] ABSTRACT

A removable attachment device for casters has a coaster-like base portion supporting the caster above the floor and a fastening portion retaining the caster roller on the base portion whereby the caster is prevented from rolling. The attachment device is removably fastened to the caster.

9 Claims, 8 Drawing Figures

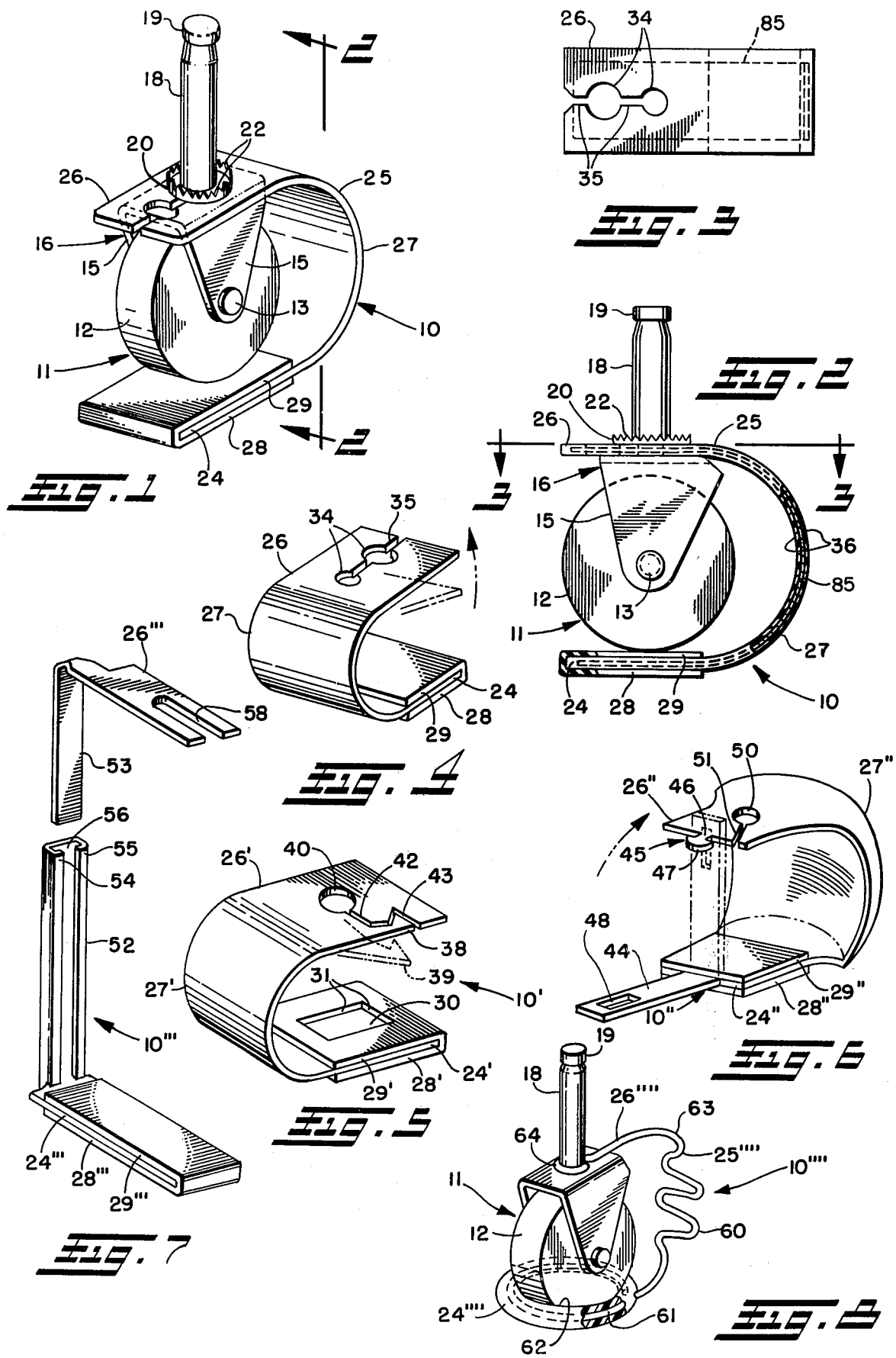

ATTACHABLE COASTER-LIKE DEVICE

BACKGROUND OF THE INVENTION

The present invention relates to coaster-like devices for casters used on furniture, appliances and like articles. Casters are often secured to the legs of such articles to facilitate movement from place to place by rolling. However, when the article is properly positioned, it is desirable to prevent it from rolling about. Therefore, coasters, floor protectors and the like have been placed under the caster to prevent rolling thereof.

Presently known coasters are usually of one-piece construction and are made of a rubber-like material. The coaster generally has a flat bottom surface which rests on the floor and a concave upper surface in which the caster wheel or ball rests. The raised borders of the upper surface are intended to retain the wheel on the coaster. However, the casters sometimes roll over the raised borders of the coasters and onto the floor. Not only does the article then roll about, but on some floors the caster roller may mar the surface thereof or cause other damage. Therefore, it is desirable to provide a coaster-like device which will remain beneath the caster to prevent rolling thereof and protect the floor from damage.

It is sometimes desirable to move the caster equipped article by lifting and transporting it to a new location. When doing so, however, conventional coasters used therewith must each also be moved and placed under the legs of the article at its new location, a somewhat difficult task especially when larger items are being moved. Therefore, it is desirable to provide a coaster-like device which will be retained by the caster during such movement of the item.

SUMMARY OF THE INVENTION

The attachment device of the present invention includes a coaster-like base and fastening portion, the latter having a side portion and an arm adapted to accommodate the stem of the caster. The coaster-like base supports the roller of the caster above the floor to prevent rolling. The base may be of a simple construction rather than the more complex concave surface of the presently known coasters because the caster is retained on the base by the fastening portion as will be more fully described. A friction pad, preferably made of rubber, may be secured to the bottom of the base for gripping contact with the floor to prevent the base and caster retained thereon from sliding relative thereto, especially on hard smooth floors. The pad also serves to protect the floor from marring and scuffing which sometimes occurs when the caster roller is in direct contact with the floor. The top surface of the base may also be provided with a similar pad to assist the fastening portion in retaining the roller on the base. In addition, the top surface or the upper pad may be indented further to retain the roller thereon.

The fastening portion is adapted releasably to retain the stem of the caster to keep it on the base and to secure the attachment device to the caster. The arm portion thereof is provided with a slot which accommodates the stem of the caster thereby securely attaching the device to the caster. To better secure the stem, the slot may have narrow and wide portions with the stem being retained in the wide portion. The arm may be made of a flexible material whereby the narrow portion of the slot may be spread apart to allow the stem to be inserted and removed. Alternatively, the arm may include a flexible flap which is deformable to allow the stem to be inserted in the slot and closable to retain the stem therein. Preferably, the arm is sufficiently thin so that it may be inserted between the yoke and swivel washer of casters so constructed. In another arrangement the fastening portion comprises a spring member having one end connected to the base and the other end adapted for attachment to the caster.

The arm and base are vertically spaced apart and connected to each other by the side portion. The side portion may be adjustable to vary the vertical spacing between the arm and base so that the device may be used with different sizes of casters. To vary the spacing, the side portion may be made of a flexible material which allows the arm and base to spread apart or towards each other to adjust the vertical spacing therebetween. In addition, the device is preferably preformed with generally a horse-shoe shape so that the arm and base must be spread apart to allow attachment of the device to the caster. When attached, the device will firmly clamp around the caster to further fasten the device to the caster. Alternatively, the side portion may be vertically expandable. In addition, the side portion may be generally spherical partially to surround the caster and to provide a smooth exposed surface forming a protective shield.

The device is preferably made of plastic or rubberized plastic, but may also be made of metal. As described, the device is inexpensive, durable and of easily manufactured construction.

To use the device, the article need only be lifted the height of the base to allow the base to slip beneath the roller. The fastening portion is slipped around the stem of the caster securely to attach the device to the caster. When attached, the caster is precluded from rolling and the caster also will not slip out of the device. In addition, if the item is carried about, the attachment device will be moved along with the caster as a unit. To allow the caster to roll the device may be easily removed and later replaced when needed.

It is therefore a principal object of the present invention to provide an inexpensive, durable, and easily manufactured device for preventing a caster from rolling.

Another object is to provide a coaster-like device which is moved with the caster as a unit.

A further object is to provide a coaster-like device which protects the floor from damage.

An additional object is to provide a device which may be easily attached and removed from a caster.

Still another object is to provide a protective shield for the caster.

Still a further object is to provide an attachable coaster-like device which may be used with various sizes of casters.

BRIEF DESCRIPTION OF THE DRAWINGS

FIG. 1 is a perspective illustration of a caster with an attachment device in accordance with the present invention attached thereto;

FIG. 2 is a side elevational view, partly in section, of the device of FIG. 1, taken along the line 2—2;

FIG. 3 is a top plan view of the device of FIG. 2, taken along the line 3—3, with the caster removed;

FIG. 4 is a perspective view of the attachment device showing the flexible adjustability thereof;

FIG. 5 is a perspective illustration of a modification of the attachment device;

FIG. 6 is a perspective illustration of another modification of the attachment device; and FIG. 7 is a perspective illustration of another embodiment of the attachment device of the present invention.

FIG. 8 is a perspective illustration of still another embodiment of the attachment device of the present invention.

DESCRIPTION OF THE PREFERRED EMBODIMENT

Referring now to the drawings and initially to FIGS. 1 through 4, the attachment device of the present invention is generally designated at 10 and is shown attached to a conventional caster 11. The caster 11 has a roller 12 pivotally mounted for rotation about a horizontally disposed shaft 13 supported at either end in downwardly extending arms 15 of the U-shaped yoke 16. A stem 18 having a knob 19 at the distal end thereof extends vertically from the yoke 16 and is adapted for attachment to furniture legs or the like by conventional means. A swivel washer 20 is usually provided to center the stem 18 within the bore in the furniture legs with vertically extending teeth 22 biting into the distal end of the leg. Although the attachment device is shown attached to a caster of the type described above, it should be pointed out that the attachment device may be readily used with other types of casters, e.g., ball casters.

The attachment device 10 includes a coaster-like base 24 and a fastening portion 25 with the latter comprising an arm 26 generally parallel with and above the base 24 and a side portion 27 interconnecting and vertically spacing apart the base and arm. The base 24 is adapted to support the roller 12 away from the floor to render the caster 11 inoperative. The base 24 is retained beneath the roller 12 by the fastening portion 25 which is releasably secured to the stem 18. In its preferred embodiment, the component parts are integrally formed and the device is generally of U-shape with the base 24 and arm 26 forming the respective arms thereof.

A lower pad 28 may be secured to the bottom surface of the base 24 to prevent the attachment device 10 and caster 11 from sliding across the floor. The pad is preferably made of a rubber or rubber-like material, such having a high coefficient of friction to prevent sliding across floor surfaces, particularly hard and smooth floors, and being soft to prevent marring and scuffing of the floor. An upper pad 29, made of a similar material as the lower pad 28, may be secured to the upper surface of the base 24 to assist the fastening portion 25 in preventing the caster 11 from rolling. Preferably, the lower and upper pads 28 and 29 are a single strip which is wrapped around the end of the base 24 and secured to the respective surfaces thereof. In addition, the upper surface of the base 24 or the upper pad 29 may be indented as shown in FIG. 5 to provide a bowl 30 with shoulders 31 which further prevents rolling of the caster 11 off the base 24.

The fastening portion 25 is adapted to slip between the bracket 16 and swivel washer 20. As best shown in FIGS. 1 and 3, the arm 26 includes enlarged slots or stem retaining holes 34 to retain the caster stem when inserted therein. Preferably, the holes 34 are of different diameters whereby different diameters of stems may be accommodated. An access slot 35 extends longitudinally between the holes and further to the periphery of the retaining portion 26 to allow passage of the stem 18 therethrough when the device is being attached or removed from the caster. The width of the slot 35 is preferably less than the diameter of the caster 18 so that the stem 18 is retained in the holes 34. To permit the stem 18 to pass through the slot 35, the arm 26 is made of a flexible material whereby the slot 35 may be deformably widened when the stem 18 of the caster 11 is inserted therein and returned to its normal closed position, when the stem 18 is in one of the stem retaining holes 34 thereby effectively locking the stem 18 therein.

The attachment device of the first embodiment is preferably made of a flexible plastic or rubber-like material to allow some bending thereof. Such material should be sufficiently strong to withstand rolling forces tending to cause the caster to slip out of the device. The device may be provided with a spring metal core 85 encased in plastic 36 as shown in FIGS. 2 and 3 to give greater strength to the device while retaining flexibility. Preferably, the device is performed with generally a horseshoe-shape as shown in FIG. 4 in solid lines. When attaching the device to a caster, the flexible side portion is deformed (shown in phantom) to increase the spacing between the arm 26 and base 24 allowing the device to be attached to a caster. When properly positioned and released, the attachment device will clamp around the caster further securely fastening the device to the caster. In addition, by deformably varying the spacing between the arm 26 and base 24, various sizes of casters may be accommodated.

Referring now to FIG. 5 wherein primed reference numerals designate parts corresponding generally to those identified above by the same unprimed reference numerals, a modified attachment device 10' is shown with a different arm 26'. In this form, the arm 26' has a resilient flap 38 which when deformed to a first position 39 (shown in phantom) provides an access passage of sufficient width to permit the stem 18 to be inserted or removed. The flap 38 is then released so that it returns to its normal position in the plane of the arm 26', thereby effectively retaining the stem 18 in the hole 40. Preferably, the entire arm is made of a flexible material whereby the flap 38 may be simply formed by making a Z-shaped slit 42 in the arm 26'. The slit may be made in such a fashion to form a hook 43 extending inwardly at the end of the flap 38 to assure retention of the stem 18 in the stem hole 40.

In FIG. 6, wherein double primed reference numerals designate parts corresponding generally to those identified by the same but unprimed reference numerals, there is illustrated another modified attachment device 10" having a locking flap 44 integrally connected to the base 24". The locking flap 44 is pivotally deformed to a generally horizontal open position (shown in solid lines) to allow the device to be attached to a caster and to a generally vertical locked position (shown in phantom) to retain the caster therein. The arm 26" has at its distal end a tab 45 having a reduced portion 46 and an enlarged portion 47. The locking flap 44 has a longitudinal slot 48 having an approximate width equal to that of the reduced portion 46 so that the reduced portion 46 of the tab 44 may reside therein when the flap 44 is in its locked position. The flap 44 is made of a deformable material whereby the slot 48 widens to allow the enlarged portion 47 to pass therethrough and then close around the reduced portion 46. The arm 26" has a stem-retaining hole 50 and access slot 51 similar to that of FIG. 1 except that the slot 51 extends obliquely with respect to the longitudinal axis of the arm 26". The slot 51 is so positioned that when the flap 44 is in its second position, the yoke 16 or the roller 12 of the caster 11 will contact the flap 44 thereby preventing the caster stem 18 from sliding through the slot 49 when force is exerted thereon. As also shown in FIG. 6, the side portion 27″ is spherically shaped to provide a large covering for the caster wheel, for example, for shielding purposes.

Referring now to FIG. 7, wherein triple primed corresponding reference numerals are used as above, another embodiment of the attachment device 10′″ in accordance with the invention is illustrated. In this embodiment, the side portion 27′″ of the device is vertically expandable to accommodate various sizes of casters. The base 24′″ and arm 26′″ have respective vertical extensions 52 and 53. The extension 52 has L-shaped flanges 54 and 55 extending inwardly at the sides thereof forming a C-shaped channel 56. The extension 53 is slidably movable in the channel 56 to vary the vertical spacing between the base 24′″ and arm 26′″. In this embodiment, the arm 26′″ is provided with a retaining slot 58 of sufficient width to accommodate the stem of a caster.

In FIG. 8, wherein quadruple primed reference numerals designate parts corresponding generally to those identified by the same unprimed reference numerals, there is illustrated another embodiment of the attachment device 10″″ wherein the fastening portion 25″″ is comprised of a generally C-shaped spring member 60. The spring member 60 is a preformed wire with its lower portion 61 secured to the base 24″″. Preferably, the lower portion 61 is oval-shaped with the plastic base 24″″ molded around it. The base may have a depression 62 into which the roller 12 rests. The upper portion 63 of the spring member 60 is generally helical having an arm 26″″ at its distal end shaped into a hook 64. The hook 64 is adapted to be attached to the caster 11, preferably around the stem 18 of the caster. The spring member 60 is preferably preformed so that it must be deformed to increase the spacing between the hook 64 and base 24″″ when being attached to the caster 11. In a similar fashion to that described with respect to FIG. 4, the device 10″″ will clamp around the caster 11 to further fasten the device 10″″ to the caster 11.

To use the attachment device of the present invention, the attachment device may be secured to the caster by slipping the base 24 beneath the roller and inserting the arm 26 between the yoke 16 and swivel washer 22 securing the stem 18 therein, thereby preventing the caster 11 from rolling. When so attached the furniture piece may be lifted with the attachment device attached and without it falling off. If it is desired to roll the article about, the caster may be readily slipped off. Furthermore, various sizes may be accommodated in the several embodiment by varying the vertical spacing between the stem-retaining portion and base.

I, therefore, particularly point out and distinctly claim as my invention:

1. An attachment device for casters of the type having mounting stems comprising, base means for supporting a caster above the floor and means for removably attaching said base means to the caster, said means for removably attaching including an arm positioned above said base means, said arm being adapted for releasably retaining the stem of the caster, means for interconnecting said arm and said base means, flap means attached to the end of said base means opposite said means for interconnecting, said flap being deformable to a generally horizontal position to allow attachment of the device to the caster and to a generally vertical position to prevent removal of the device, and means for releasably locking the distal end of said flap means to said arm.

2. The attachment device of claim 1 wherein said means for interconnecting comprises shield means for partially surrounding the caster thereby to prevent contacting foreign objects from the caster.

3. The attachment device of claim 1 wherein said arm, means for interconnecting and base means are integrally formed.

4. An attachment device for casters of the type having mounting stems comprising, base means for supporting a caster above the floor and means for removably attaching said base means to the caster, said means for removably attaching including an arm above said base means and means for adjusting the spacing between said arm and base means whereby such device may be used with variously sized rollers, said arm having portions defining a slot, said slot being adapted to retain the stem of a caster therein.

5. An attachment device for casters comprising, base means for supporting a caster above the floor and means for removably attaching said base means to the caster, said means for removably attaching including an arm above said base means and means for adjusting the spacing between said arm and base means whereby such device may be used with variously sized rollers, said base means and said arm having respective vertically extending portions thereof, and said means for adjusting including means for slidably connecting said respective vertically extending portions for longitudinal movement thereof to adjust the vertical spacing between said arm and said base means.

6. An attachment device for casters comprising, base means for supporting a caster above the floor and means for removably attaching said base means to the caster, said means for removably attaching including a preformed spring member, one end of said spring member being connected to said base means and the other being adapted for attachment to the caster.

7. An attachment device for casters of the type having mounting stems comprising, base means for supporting a caster above the floor and means for removably attaching said base means to the caster, said means for removably attaching including an arm above said base means and a side portion extending between and interconnecting said arm and base means, said arm having portions defining a slot, said slot being adapted to retain the stem of a caster therein, said side portion being deformable to vary the spacing between said arm and base means, and said arm and base means being spaced apart less than when attached to the caster whereby the device will firmly clamp around the caster when fastened thereto.

8. The attachment device of claim 7 wherein said slot has narrow and wide portions, said wide portion being of sufficient size to retain the stem of the caster therein, said narrow portion having a width less than that of the stem of the caster and extending from said wide portion to the outer periphery of said arm thereby providing a passageway for removal and insertion of the stem.

9. The attachment device of claim 8 wherein said narrow portion is deformable to a size greater than that of the stem whereby the slot allows passage of stems when deformed and retains same in said wide portion when not deformed.

* * * * *